(12) United States Patent
Leng

(10) Patent No.: US 11,148,369 B2
(45) Date of Patent: Oct. 19, 2021

(54) METHOD FOR WRAPPING EDGE OF COMPOSITE BOARD

(71) Applicant: NEW-TEC INTEGRATION (XIAMEN) CO., LTD., Xiamen (CN)

(72) Inventor: Luhao Leng, Xiamen (CN)

(73) Assignee: NEW-TEC INTEGRATION (XIAMEN) CO., LTD., Xiamen (CN)

(*) Notice: Subject to any disclaimer, the term of this patent is extended or adjusted under 35 U.S.C. 154(b) by 108 days.

(21) Appl. No.: 16/329,138

(22) PCT Filed: Aug. 28, 2017

(86) PCT No.: PCT/CN2017/099300
§ 371 (c)(1),
(2) Date: Feb. 27, 2019

(87) PCT Pub. No.: WO2018/041070
PCT Pub. Date: Mar. 8, 2018

(65) Prior Publication Data
US 2019/0193340 A1 Jun. 27, 2019

(30) Foreign Application Priority Data
Aug. 31, 2016 (CN) .......................... 201610785201.6

(51) Int. Cl.
*B29C 65/00* (2006.01)
*B29C 65/02* (2006.01)
(Continued)

(52) U.S. Cl.
CPC ............ *B29C 66/43* (2013.01); *A47B 96/205* (2013.01); *B29C 53/36* (2013.01); *B29C 63/04* (2013.01);
(Continued)

(58) Field of Classification Search
None
See application file for complete search history.

(56) References Cited

U.S. PATENT DOCUMENTS

| | | | |
|---|---|---|---|
| 5,983,807 A * | 11/1999 | Tarnay | A47B 3/0912 108/131 |
| 2003/0232160 A1* | 12/2003 | Spengler | B29C 35/16 428/34.1 |
| 2009/0324872 A1* | 12/2009 | Leng | B32B 3/04 428/73 |

FOREIGN PATENT DOCUMENTS

| CN | 1657275 A | 8/2005 |
|---|---|---|
| CN | 2829461 Y | 10/2006 |

(Continued)

OTHER PUBLICATIONS

Xu Bangxue: "Practical Handbook of New Standards for Construction and Housing Engineering", May 31, 2003, Beijing Seismological Press, 4 pages.

*Primary Examiner* — Barbara J Musser
(74) *Attorney, Agent, or Firm* — Cooper Legal Group, LLC

(57) ABSTRACT

Disclosed is an edge wrapping method for a composite board, the top board of the composite board surrounds the bottom board of the composite board, a part or all of the side of the top board is disposed with a connecting portion extending beyond the bottom board and extending outwardly; the adjacent portion of the connecting portion and the bottom board are heated, and then the connecting portion is folded toward the inner side of the composite board and the connecting portion is welded to the side of the bottom board. The connecting portion and the bottom board are heated, and the root portion of the connecting portion near one end of the bottom board and the position of the bottom board close to the connecting portion are heated to a molten (Continued)

state, and then, the connecting portion is folded, and the connecting portion and the bottom board are welded together, the production efficiency of the present invention is high, the automatic production is realized, and the product qualification rate is effectively improved.

9 Claims, 9 Drawing Sheets

(51) Int. Cl.
    *B29C 53/36*     (2006.01)
    *A47B 96/20*     (2006.01)
    *B29C 65/20*     (2006.01)
    *B29C 63/04*     (2006.01)
    *B29L 31/44*     (2006.01)

(52) U.S. Cl.
    CPC .......... *B29C 65/02* (2013.01); *B29C 65/2076* (2013.01); *B29C 66/022* (2013.01); *B29C 66/1122* (2013.01); *B29C 66/543* (2013.01); *B29C 66/545* (2013.01); *B29C 66/71* (2013.01); *B29C 66/73921* (2013.01); *B29C 66/8322* (2013.01); *B29L 2031/441* (2013.01); *B29L 2031/443* (2013.01); *B29L 2031/448* (2013.01)

(56) References Cited

FOREIGN PATENT DOCUMENTS

| | | |
|---|---|---|
| CN | 1883338 A | 12/2006 |
| CN | 202269608 U | 6/2012 |
| CN | 102941669 A | 2/2013 |
| CN | 103434126 A | 12/2013 |
| CN | 104309107 A | 1/2015 |
| CN | 104438528 A | 3/2015 |
| CN | 205162320 U | 4/2016 |
| CN | 106363912 A | 2/2017 |
| DE | 4308925 A1 * 2/1995 ............. B60R 13/02 |
| EP | 0330223 A2 | 8/1989 |

* cited by examiner

METHOD FOR WRAPPING EDGE OF COMPOSITE BOARD

TECHNICAL FIELD

The present invention relates to an edge wrapping method for a composite board, in particular to an edge wrapping method for a composite blister board.

RELATED ART

The early production method of table tops, chair benches, ladder pedals and other boards is using wood or iron to produce an integral structure although the strength of the board is good, but the production cost is high and the weight is very large. People wanted to be able to make boards with plastic. Plastics can greatly reduce production costs and reduce weight. However, one of the most important problems with plastic board is the poor strength. In order to overcome the technical problem of poor strength of plastic board, the applicant developed and designed a new composite plastic plate in the early stage, which consists of a top board and a bottom board, and a honeycomb structure with a plurality of concave holes is formed at the bottom board, the top surface of the structure (the upper bottom surface of the recessed hole) is supported on the lower surface of the top board. This structure can effectively increase the strength of the plastic board and is very popular in the market. The periphery of the top board and the bottom board of the new composite plastic board are respectively provided with side edges. When assembling, the side edges of the top board and the side edges of the bottom board are abutted and glued together, so that the surrounding of the new composite plastic plate forms a closed structure. However, in the present production workshop, the workers manually apply glue to the side of the top board and the side of the bottom board, and then manually put the top board and the bottom board together to bond the two sides together. On the one hand, the production efficiency is low; On the other hand, the glue easily sticks to the surface of the board, resulting in a high defect rate.

SUMMARY OF THE INVENTION

The present invention provides an edge wrapping method for a composite board that overcomes the deficiencies of the prior art. The technical solution of the present invention to solve the technical problem thereof is that:

An edge wrapping method for a composite board, the composite board comprises a top board, a bottom board and a reinforcing frame, the bottom board forms a honeycomb structure with a plurality of concave holes upwardly; the reinforcing frame is first placed on the inner side of the side of the bottom board, the side portion of the top board is partially or completely surrounded by the outer side of the bottom board, wherein a part or all of the side of the top board is disposed with a connecting portion extending beyond the bottom board and extending outwardly; the adjacent portion of the connecting portion and the bottom board are heated, and then the connecting portion is folded toward the inner side of the composite board and the connecting portion is welded to the side of the bottom board.

Compared with the background art, the technical solution of the present invention has the following advantages:

The connecting portion and the bottom board are heated, and the root portion of the connecting portion near one end of the bottom board and the position of the bottom board close to the connecting portion are heated to a molten state, and then, the connecting portion is folded, and the connecting portion and the bottom board are welded together, the production efficiency of the present invention is high, the automatic production is realized, and the product qualification rate is effectively improved.

BRIEF DESCRIPTION OF THE DRAWINGS

The present invention will be further described with reference to the accompanying drawings and embodiments.

DETAILED DESCRIPTION OF THE EMBODIMENTS

Figure 1:
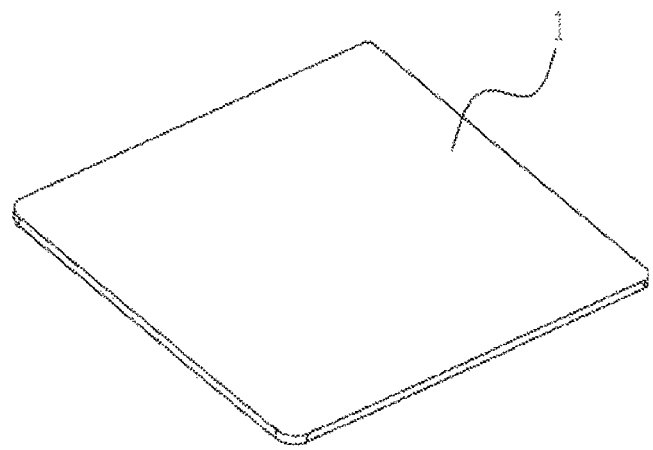
FIG. 1 shows the composite board of the present invention.
Figure 2:
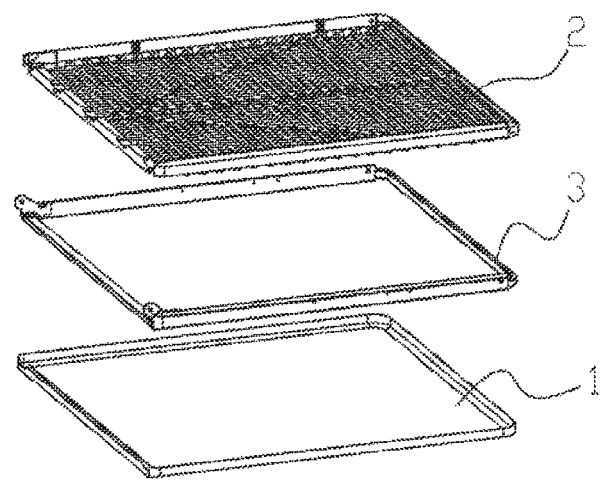
FIG. 2 illustrates an exploded diagram of the composite board of FIG. 1.
Figure 3:
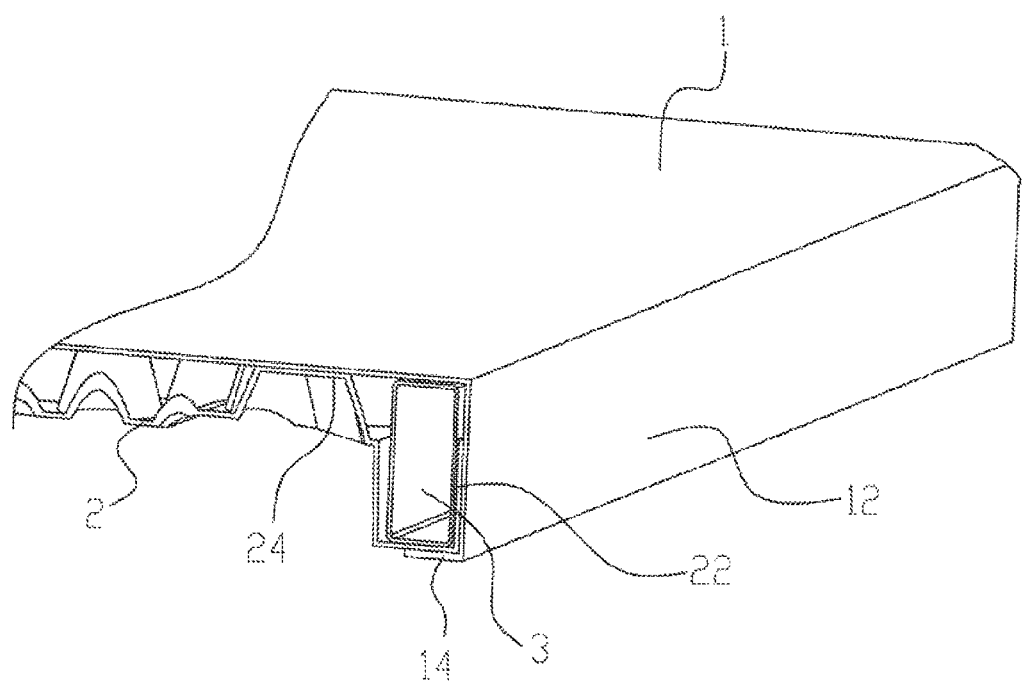
FIG. 3 illustrates a partial sectional diagram of the composite board of FIG. 1.
Figure 4A:
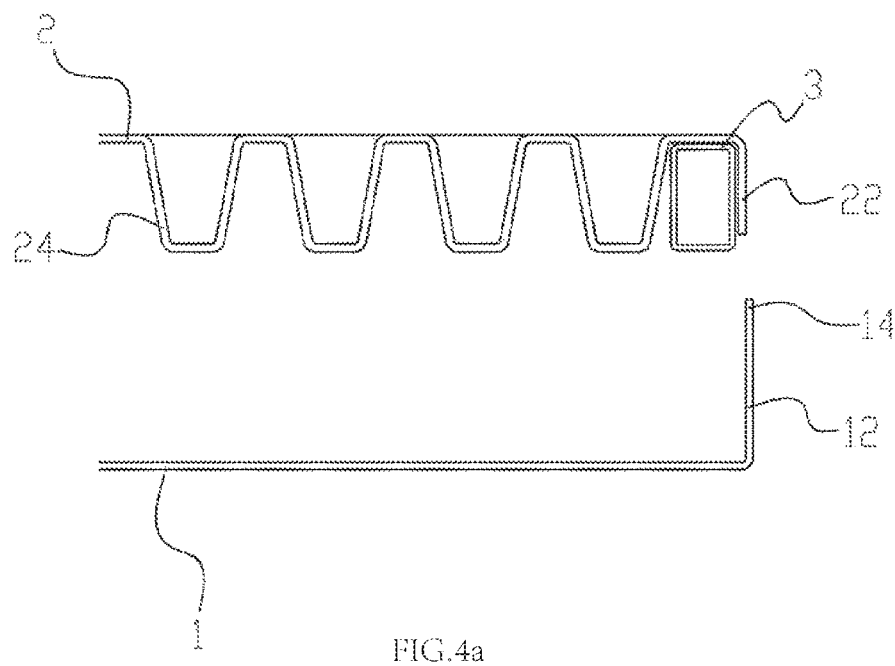
FIG. 4a shows the top board and the bottom board in separating state using the first edge wrapping method.
Figure 4B:
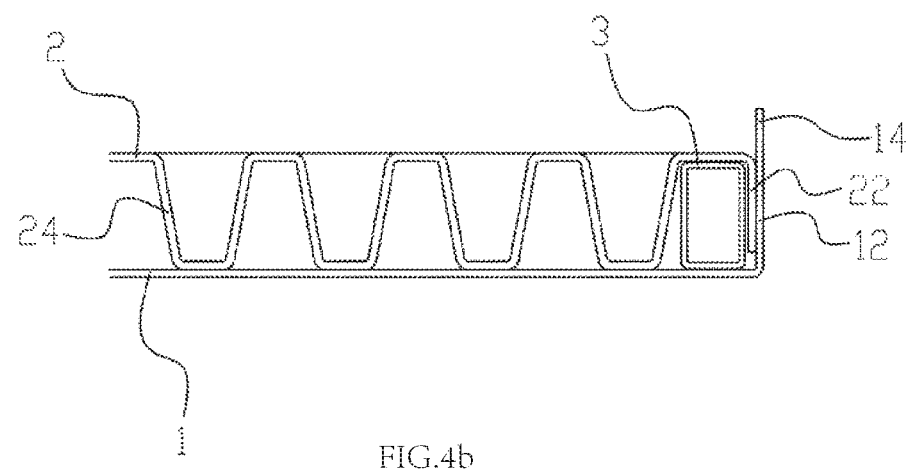
FIG. 4b shows the top board and the bottom board in composite state using the first edge wrapping method.
Figure 4C:
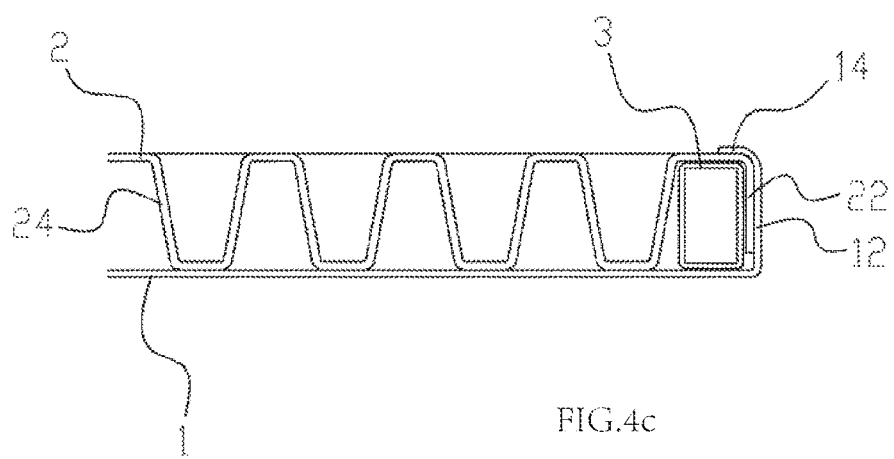
FIG. 4c shows the top board and the bottom board in welded state using the first edge wrapping method.
Figure 5A:
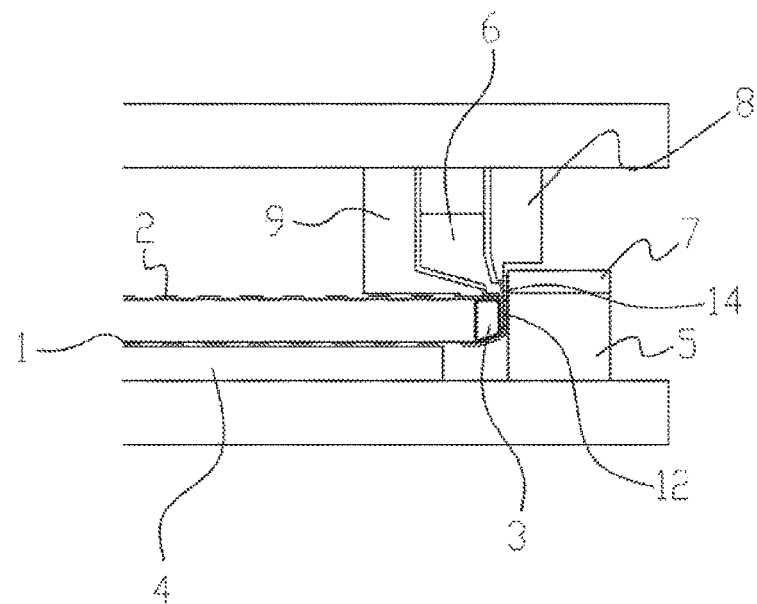
FIG. 5a shows the top board and the bottom board when heated using the first wrapping method.
Figure 5B:
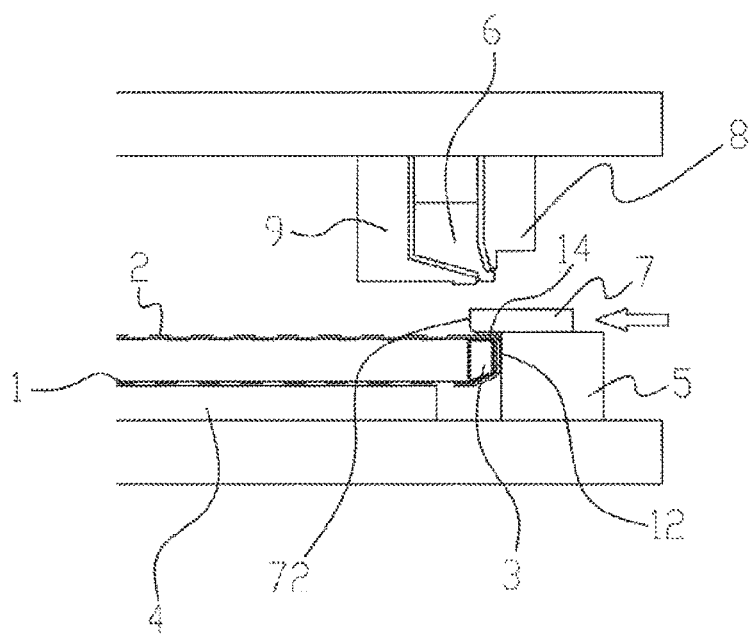
FIG. 5b shows the top board and the bottom board when the connecting portion of the top board is folded using the first wrapping method.

Referring to FIGS. 1-3, the composite board comprises a top board 1, a bottom board 2, and a reinforcing frame 3. The top board 1 and the bottom board 2 are made of PP materials. A side edge 12 is connected to the periphery of the top board 1, a side edge 22 is connected to the periphery of the bottom board 2, and the bottom board 2 is covered by the top board 1. The side edge 12 of the top board 1 surrounds the external side of the side edge 22 of the bottom board 2. The top board 1 and the bottom board 2 cooperate to enclose the reinforcing frame 3, and the reinforcing frame 3 is located at a rim portion of the composite board, and the side edge 22 of the bottom board abuts the reinforcing frame 3. The bottom board 2 is provided with a plurality of bosses 24 projecting toward one side of the top board, and the bosses 24 support the top board 1. The bottom portion of the side edge 12 of the top board 1 is further provided with a connecting portion 14, and the connecting portion 14 is welded to the bottom board 2 to assemble the top board 1 and the bottom board 2.

The connecting portion 14 and the bottom board 2 can be welded by at least three edge wrapping methods:

A first edge wrapping method is that: referring to FIG. 4a, FIG. 4b, FIG. 5a and FIG. 5b, the connecting portion 14 is vertically disposed, the side edges 12 of the top board are in a vertical plane, the connecting portion 14 extends beyond the bottom board and extends outwardly, and adjacent portion of the connecting portion 14 and the bottom board 2 are heated to a molten state by a heater 6, after which a folding mechanism 7 folds the connecting portion 14 toward the inner side of the composite board and causes the connecting portion 14 to be welded to the bottom board 2. Preferably, the folding mechanism 7 is a sliding block, and when heated, the composite board is placed on a support table 4, the edge side 12 of the top board abuts against the base 5, and the sliding block 7 is movably located above he base 5, a side positioning block 8 abuts against the edge position at the inner side of the connecting portion 14, and the side positioning block 8 cooperates with the sliding block 7 to clamp the edge position of the connecting portion 14, a bottom board positioning block 9 presses the bottom board. The sliding block 7 is provided with a vertical end surface 72 corresponding to the connecting portion 14. When heated, the connecting portion 14 abuts against the vertical end surface 72, and the sliding block 7 horizontally moves toward the inside of the composite board to fold up the connecting portion 14 and presses the connecting portion 14 against the bottom board 2 on.

Figure 6:
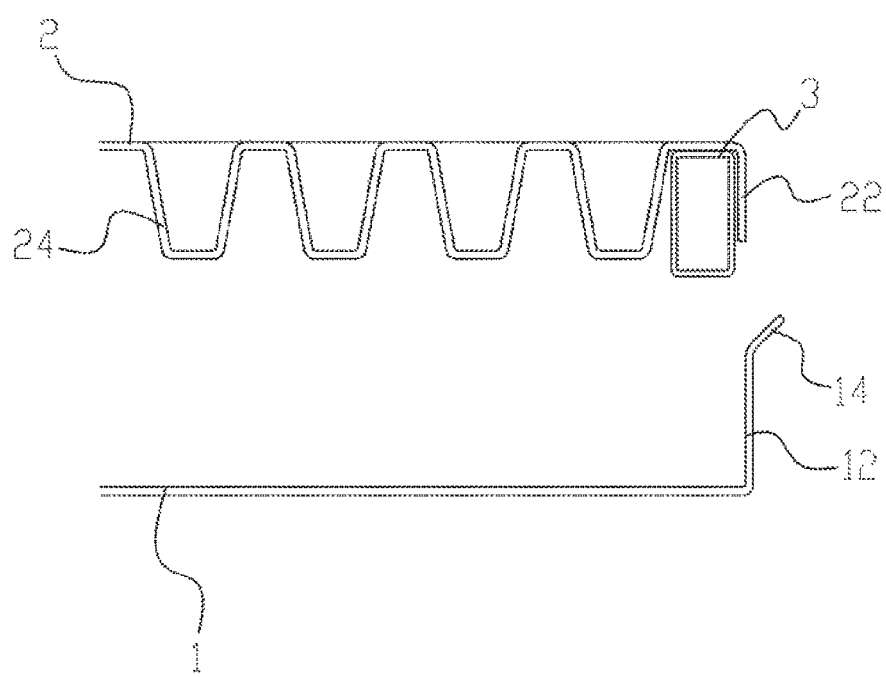
FIG. 6 shows the top board and the bottom board in separating state using the second edge wrapping method.
Figure 7A:
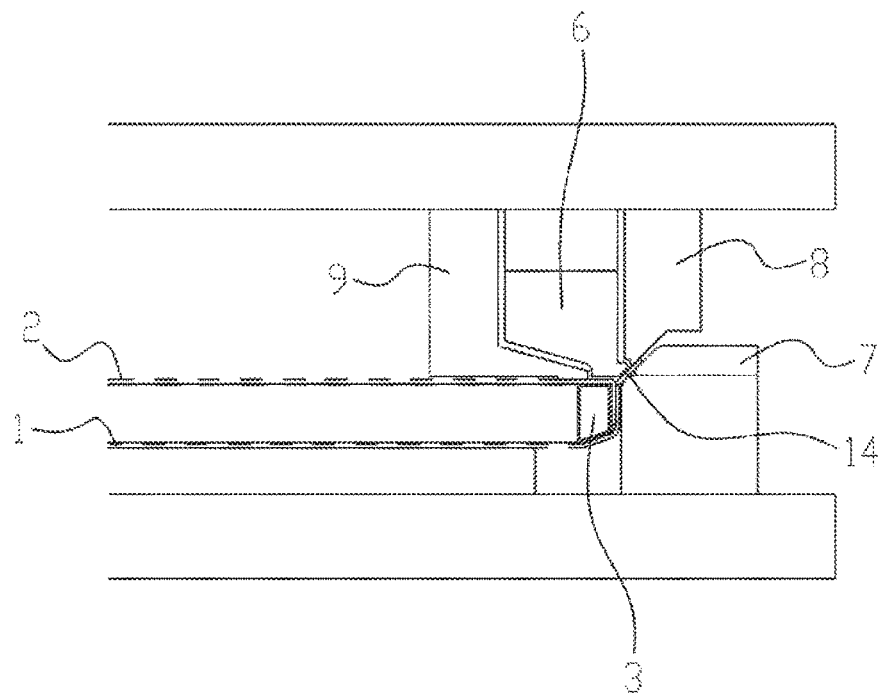
FIG. 7a shows the top board and the bottom board when heated using the second wrapping method.
Figure 7B:
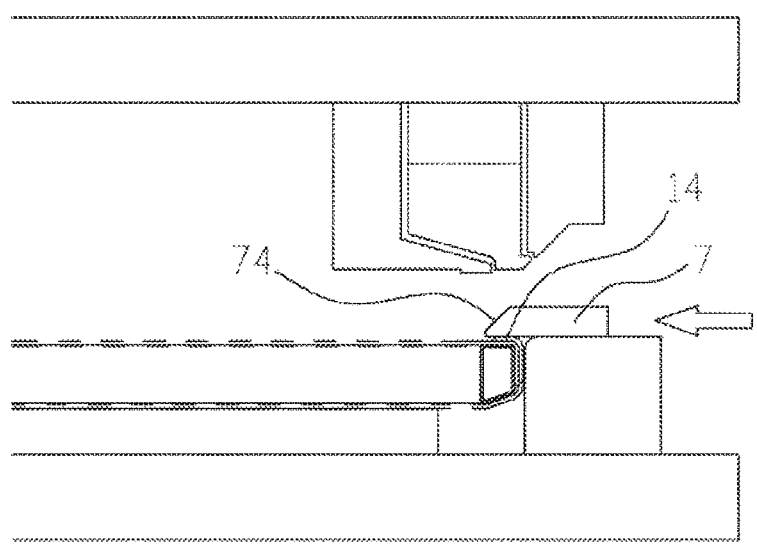
FIG. 7b shows the top board and the bottom board when the connecting portion of the top board is folded using the second wrapping method.
Figure 8:
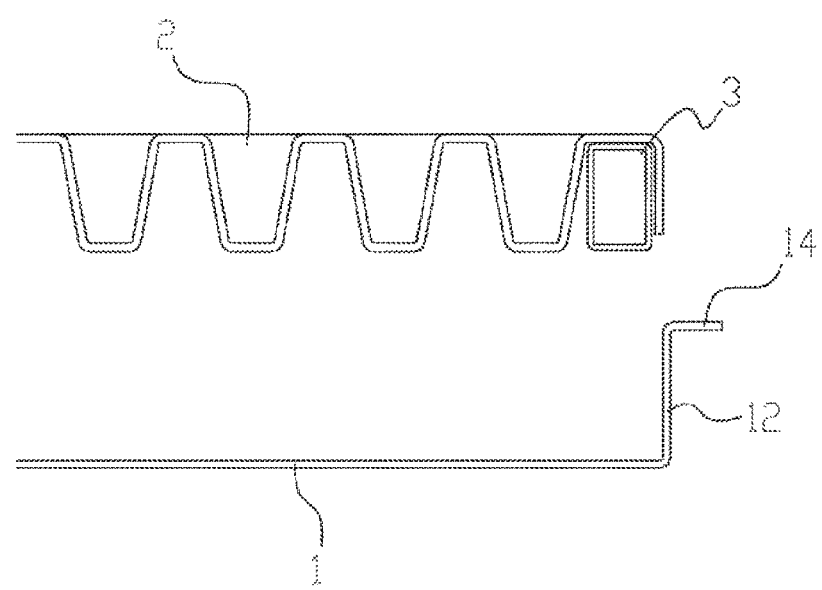
FIG. 8 shows the top board and the bottom board in separating state using the third edge wrapping method.
Figure 9A:
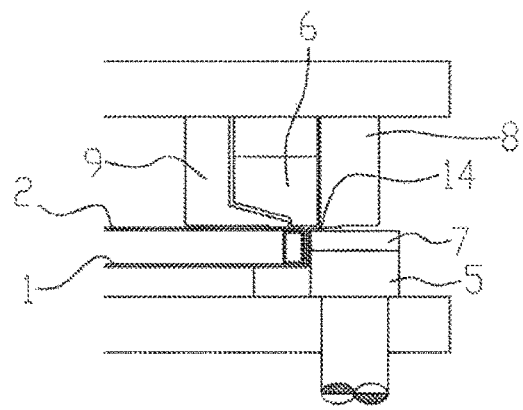
FIG. 9a shows the top board and the bottom board when heated using the third wrapping method.
Figure 9B:
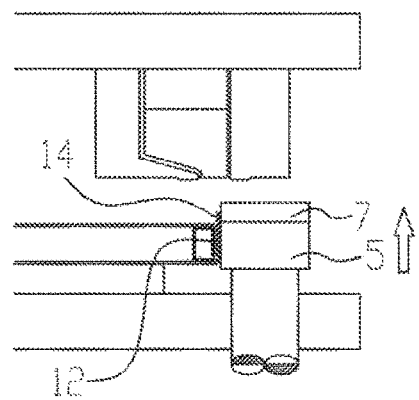
FIG. 9b shows the top board and the bottom board when the connecting portion of the top board is folded using the third wrapping method.
Figure 9C:
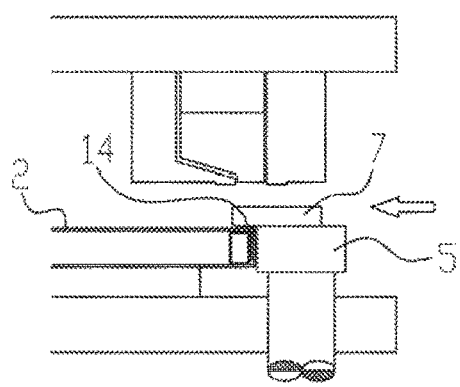
FIG. 9c shows the top board and the bottom board when the connection portion of the top board is folded using the third wrapping method.

A second method of edge wrapping, please refer to FIG. 6, FIGS. 7a, and 7b. The difference from the first method of wrapping is:

The connecting portion 14 is disposed inclined toward the outer side of the composite board, and the angle between the connecting portion 14 and the top surface of the composite board is 20-70 degrees, preferably 45 degrees. The sliding block 7 is provided with an inclined end surface 74 corresponding to the connecting portion 14, and the connecting portion 14 abuts against the inclined end surface 74 when heated.

A third edge wrapping method, please refer to FIG. 8, 9a, 9b, 9c, which differs from the first edge wrapping method in that: the connecting portion 14 is horizontally oriented toward the outer side of the composite board, after heating, firstly, the base 5 and the sliding block 7 move vertically upward together, and the extending portion of the connecting portion 14 is folded from a horizontal state to a vertical state, and then the sliding block 7 horizontally moves toward the inner side of the composite board to fold the connecting portion 14 up and presses the connecting portion 14 against the bottom board on to be welded.

Figure 10:
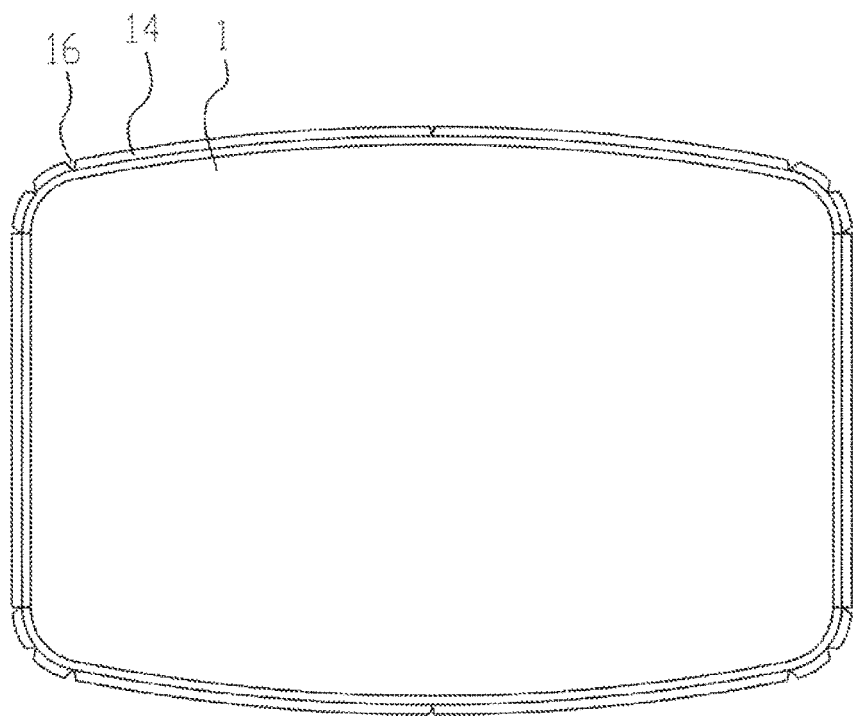
FIG. 10 shows the top board before assembly.

It can be understood that the shape of the composite board is a square, a circle, an ellipse or the like. Referring to FIG. 10, a zigzag notch 16 is provided at a bottom opening of the connecting portion 14 of the top board 1 at a circular arc transition portion. Thus, after folding up the connecting portion 14, the notch 16 can be effectively repositioned to prevent the con g portion 14 from wrinkling during welding. In addition, the side edge 12 of the top board and the connecting portion 14 are full circle structure disposed around the top board or partially disposed at a certain position of the edge of the top panel, and the side edge 12 and the connecting portion 14 may be set only at one or more sides of the top panel, or when the top board is circular or elliptical, the side edge 12 and the connecting portion 14 may he a short structure along the edge of the top board or a multi-segment structure spaced apart.

Although the present invention has been described with reference to the preferred embodiments thereof for carrying out the patent for invention, it is apparent to those skilled in the art hat a variety of modifications and changes may be made without departing from the scope of the patent for invention which is intended to be defined by the appended claims.

INDUSTRIAL APPLICABILITY

The present invention provides an edge wrapping method for a composite board, which has high production efficiency, can realize automatic production, and can effectively improve the product qualification rate.

The invention claimed is:

1. A method for wrapping an edge of a composite board, wherein:
   the composite board comprises a top board and a bottom board,
   the bottom board extends upward to define a honeycomb structure with a plurality of concave holes, and
   the method comprises:
   partially or completely encompassing an outer side of the bottom board by a side portion of the top board, wherein a part or all of the side portion of the top board is disposed with a connecting portion outwardly extending beyond the bottom board,
   abutting a side positioning block against an edge of an inner side of the connecting portion,
   clamping the edge of the connecting portion using the side positioning block and a sliding block,
   when concurrently heating and softening the inner side of the connecting portion and a portion of a bottom side of a side edge of the bottom board adjacent to the connecting portion by a heater, abutting the sliding block against an outer side of the connecting portion, and
   after heating and softening the inner side of the connecting portion:
   separating the heater from the connecting portion and the portion of the bottom side of the side edge of the bottom board,
   moving the sliding block horizontally towards an inner side of the composite board to fold the connecting portion to enable the connecting portion to abut the bottom board,
   separating the side positioning block from the connecting portion,
   and
   welding the connecting portion to the side edge of the bottom board.

2. The method for wrapping the edge of the composite board according to claim 1, comprising:
   when heating the inner side of the connecting portion and the portion of the bottom side of the side edge of the bottom board, placing the composite board on a support table, wherein an outer side of the top board abuts a base of the support table, and
   movably positioning the sliding block above the base.

3. The method for wrapping the edge of the composite board according to claim 2, wherein:
   the connecting portion comprises an extending portion horizontally extending toward an outer side of the composite board, and
   the method comprises:

abutting the base and the sliding block against the extending portion, wherein heating the inner side of the connecting portion and the portion of the bottom side of the side edge of the bottom board comprises heating an inner side of the extending portion and the portion of the bottom side of the side edge of the bottom board, moving the base and the sliding block vertically upward together to fold the extending portion from a horizontal state to a vertical state, and moving the sliding block horizontally towards the inner side of the composite board to fold the connecting portion to enable the extending portion to abut the bottom board.

4. The method for wrapping the edge of the composite board according to claim 1, wherein:

the connecting portion is vertically disposed, the sliding block is disposed with a vertical end surface corresponding to the connecting portion, and the method comprises, when heating the inner side of the connecting portion and the portion of the bottom side of the side edge of the bottom board, abutting the connecting portion against the vertical end surface of the sliding block.

5. The method for wrapping the edge of the composite board according to claim 1, wherein:

the connecting portion is inclinedly disposed toward an outer side of the composite board, the sliding block is disposed with an inclined end surface corresponding to the connecting portion, and the method comprises, when heating the inner side of the connecting portion and the portion of the bottom side of the side edge of the bottom board, abutting the connecting portion against the inclined end surface.

6. The method for wrapping the edge of the composite board according to claim 5, wherein an angle between the connecting portion and a top surface of the composite board is 20-70 degrees.

7. The method for wrapping the edge of the composite board according to claim 1, wherein:

the top board and the bottom board are made of PP (polypropylene) material, the connecting portion comprises a circular arc portion, and a zigzag notch is disposed on a bottom opening of the connecting portion at the circular arc portion.

8. The method for wrapping the edge of the composite board according to claim 1, wherein:

some or all of a periphery of the bottom board defines the side edge, the side edge of the bottom board is positioned on an inner side of the side portion of the top board, the honeycomb structure comprises a plurality of bosses projecting toward the top board, and the plurality of bosses support the top board.

9. The method for wrapping the edge of the composite board according to claim 1, wherein the method comprises placing a reinforcing frame on an inner side of the side edge of the bottom board.

\* \* \* \* \*